US012631840B2

(12) United States Patent
Lee et al.

(10) Patent No.: US 12,631,840 B2
(45) Date of Patent: May 19, 2026

(54) OPTICAL CABLE

(71) Applicant: LS CABLE & SYSTEM LTD.,
Anyang-si (KR)

(72) Inventors: Man Su Lee, Dalseo-gu (KR); Yu Hyoung Lee, Suseong-gu (KR)

(73) Assignee: LS CABLE & SYSTEM LTD.,
Anyang-si (KR)

( * ) Notice: Subject to any disclaimer, the term of this patent is extended or adjusted under 35 U.S.C. 154(b) by 266 days.

(21) Appl. No.: 18/286,635

(22) PCT Filed: Aug. 5, 2022

(86) PCT No.: PCT/KR2022/011674

§ 371 (c)(1),
(2) Date: Oct. 12, 2023

(87) PCT Pub. No.: WO2023/033386

PCT Pub. Date: Mar. 9, 2023

(65) Prior Publication Data

US 2024/0192457 A1     Jun. 13, 2024

(30) Foreign Application Priority Data

Aug. 31, 2021    (KR) ........................ 10-2021-0115372
Aug. 3, 2022    (KR) ........................ 10-2022-0096589

(51) Int. Cl.
G02B 6/44        (2006.01)
(52) U.S. Cl.
CPC ......... G02B 6/4431 (2023.05); G02B 6/4432
(2013.01)

(58) Field of Classification Search
CPC ........................... G02B 6/4431; G02B 6/4482
See application file for complete search history.

(56) References Cited

U.S. PATENT DOCUMENTS

| | | | |
|---|---|---|---|
| 9,140,867 B1 | 9/2015 | Sandate Aguilar et al. | |
| 9,323,022 B2 | 4/2016 | Bringuier et al. | |
| 2001/0043781 A1 | 11/2001 | Yokokawa et al. | |
| 2005/0036750 A1* | 2/2005 | Triplett ................ | G02B 6/4431 |
| | | | 385/100 |
| 2013/0108226 A1* | 5/2013 | Gimblet ............... | G02B 6/4431 |
| | | | 385/100 |
| 2020/0142144 A1* | 5/2020 | Blazer .................. | G02B 6/4403 |
| 2021/0247579 A1* | 8/2021 | Abercrombie ....... | G02B 6/4431 |
| 2022/0003949 A1* | 1/2022 | Sato ..................... | G02B 6/4432 |

FOREIGN PATENT DOCUMENTS

| | | | | |
|---|---|---|---|---|
| DE | 19928506 A1 * | 9/2000 | .......... | G02B 6/4482 |
| JP | 2001110243 A * | 4/2001 | | |
| JP | 2001228373 A * | 8/2001 | | |
| JP | 2001264602 A * | 9/2001 | | |

(Continued)

OTHER PUBLICATIONS

English translation of JP2001110243A (Year: 2001).*

(Continued)

*Primary Examiner* — Charlie Y Peng
(74) *Attorney, Agent, or Firm* — K&L Gates LLP

(57)        ABSTRACT

The present disclosure relates a multi-core optical cable with a plurality of optical units, in which damage to a core is prevented during the stripping of a jacket for connection or splitting of the optical cable, and the workability of stripping the jacket is improved.

20 Claims, 8 Drawing Sheets

(56)        References Cited

FOREIGN PATENT DOCUMENTS

| JP | 2006133339 A |   | 5/2006 |
| JP | 2006171570 A |   | 6/2006 |
| JP | 2007034161 A |   | 2/2007 |
| JP | 2010277062 A | * | 12/2010 |
| JP | 2020038326 A |   | 3/2020 |
| KR | 2019990034138 U |   | 8/1999 |
| KR | 20050074453 A |   | 7/2005 |
| KR | 20060124506 A |   | 12/2006 |
| KR | 1020190018704 A |   | 2/2019 |
| KR | 20190051902 A |   | 5/2019 |

OTHER PUBLICATIONS

English translation of DE-19928506-A1 (Year: 2000).*
English translation of JP-2001228373-A (Year: 2001).*
Examination Report for related Canadian Application No. 3,213,133; action dated Nov. 26, 2024; (6 pages).
International Search Report for related International Application No. PCT/KR2022/011674; action dated Mar. 9, 2023; (3 pages).
Written Opinion for related International Application No. PCT/KR2022/011674; action dated Mar. 9, 2023; (5 pages).
Office Action for related Canadian Application No. 3,213,133; action dated Oct. 16, 2025; (5 pages).
Extended European Search Report for related European Application No. 22864894.5; action dated Aug. 4, 2025; (8 pages).

* cited by examiner (a)

(b)

(c)

(d)

(e)

(f)

(a)

(b)

OPTICAL CABLE

CROSS-REFERENCE TO RELATED APPLICATIONS

The present application is a National Stage of International Application No. PCT/KR2022/011674 filed on Aug. 5, 2022, which claims the benefit of Korean Patent Application No. 10-2021-0115372, filed on Aug. 31, 2021, and Korean Patent Application No. 10-2022-0096589, filed Aug. 3, 2022 with the Korean Intellectual Property Office, the entire contents of which are hereby incorporated by reference.

FIELD

The present disclosure relates to an optical cable. More specifically, the present disclosure relates a multi-core optical cable with a plurality of optical units, in which damage to a core is prevented during the stripping of a jacket for connection or splitting of the optical cable, and the workability of stripping the jacket is improved.

BACKGROUND

Recently, with the increase in the demand for ultra-high-speed communication, the demand for an optical cable-based communication network is continuously increasing. An optical cable has a large bandwidth and is heavy and bulky compared to an existing copper cable and thus is very advantageous to build an ultra-high-speed transmission network.

To build a large-capacity optical communication network, an optical cable may be configured by accommodating a plurality of optical fibers in a jacket or a tubular member of the optical cable. For example, an optical cable may be configured by accommodating, in the jacket or the tubular member, a plurality of rollable optical fiber ribbons that are formed by aggregating and bonding a plurality of optical fibers in a line and that are rollable in a width direction.

FIG. 1 illustrates examples of a multi-core optical cable 100 of the related art.

The multi-core optical cable 100 of FIG. 1 includes a core C accommodated in a jacket 80. The core C may include a plurality of optical fibers 11, and the plurality of optical fibers 11 may be aggregated by a aggregation means, such as a binding yarn, a binding tape or a tube, to form one or more optical units 10.

As shown in FIG. 1, in order to reinforce the tensile strength and rigidity of the cable, the core C may be configured by providing a central tensile wire 1 at a center of the cable and arranging the optical units 10 around the central tensile wire 1, a reinforcing member 70 may be embedded in the jacket 80 covering the core C that includes the plurality of optical units 10 without the central tensile wire 1, or both the central tensile wire 1 and the reinforcing member 70 may be used.

The central tensile wire 1 and the reinforcing member 70 may be formed of a material such as fiber reinforced plastics (FRP) or aramid yarn.

The core C may be configured by covering the plurality of optical units 10 with an aggregation means 50 such as a binding tape, and may be covered with the jacket 80 to form the optical unit 100.

The core C may include a ripcord 60 or the like between the aggregation means 50 and the jacket 80 to remove the jacket 80.

The ripcord 60 may be provided to strip the jacket 80 for connection of the optical cable 100. The ripcord 60 may be in the form of a fiber and be provided at a position, or a pair of ripcords 60 may be provided at symmetrical positions as shown in FIG. 1.

First, for the connection or splitting of an optical cable, a jacket should be stripped by a certain length, and a worker may expose at least a portion of a ripcord by cutting an end of the jacket by a cutter or the like to strip the jacket by the length.

When the ripcord is exposed at an end of the optical cable, the worker may pull the ripcord to cut the jacket by an appropriate length, and remove the jacket from a cut portion of the jacket to expose the core of the optical cable.

As described above, the jacket can be easily removed through the ripcord but the ripcord is disposed inside the jacket. Thus, it is difficult to identify the position of the ripcord outside the jacket. Even when the position of the ripcord is identified by a separate identification means, an actual position of the ripcord may be changed due the bending or twisting of the optical cable and thus a process of cutting the jacket may be repeatedly performed at various positions.

In this regard, Japanese Patent Publication No. JP 2014-119635 A discloses a technique for covering a jacket to prevent movement of a ripcord while an outer side of the ripcord with a separate winding member.

In the embodiment of FIG. 1, when a cutting depth is not accurately adjusted during the cutting of the jacket of the optical cable by a cutter or the like to expose the ripcord, the ripcord may be cut or the core of the optical cable may be damaged, and the optical units or the optical fibers may be damaged in severe cases.

Even when the ripcord is exposed, a large force may be required to tear the jacket by pulling the ripcord when a thickness of the jacket is large or the ripcord formed of a fiber may be short-circuited or separated without tearing the jacket.

SUMMARY

The present disclosure is directed to providing an optical cable, which is a multi-core optical cable with a plurality of optical units and in which damage to a core is prevented during the stripping of a jacket for connection or splitting of the optical cable, and the workability of stripping the jacket is improved.

To achieve these objects, the present disclosure provides an optical cable comprising: a core including at least one optical unit with a plurality of optical fibers; a jacket surrounding the core; at least one jacket stripping channel formed consecutively as an empty space between the jacket and the core in a longitudinal direction of the optical cable; and an identification means provided on an outer circumferential surface of the jacket to identify a position, at which the jacket stripping channel is formed, outside the jacket, wherein the jacket stripping channel is in the form of a groove having round corners and formed on an inner circumferential surface of the jacket, and the empty space of the stripping channel is exposed without causing damage to the core when the jacket is removed along the identification means by a jacket stripping tool, a maximum height of the jacket stripping channel is 0.5 mm or more, and a minimum thickness ($t_n$) of the jacket at the position at which the at jacket stripping channel is formed is in a range of 20% to 90% of an average thickness of the jacket at which a position at which the jacket stripping channel is not formed.

And the jacket stripping channel may be formed to cause a thickness of the jacket in a radial direction from a center of a cross section of the optical cable to be less than a thickness of the jacket at a position at which the identification means is not provided.

And the jacket stripping channel may be formed by allowing an extrusion dice to pass through the jacket during extrusion-molding of the jacket, the extrusion dice having a shape corresponding to a shape of the jacket stripping channel.

And a width of a cross section of the jacket stripping channel may decrease in a radial direction from a center of the optical cable.

And the width of the cross section of the jacket stripping channel may decrease non-linearly.

And a radius of curvature of an inner side of the jacket stripping channel may be less than or equal to a radius of curvature of the optical cable.

And a maximum width of the jacket stripping channel may be greater than the maximum height of the jacket stripping channel.

And an angle of an inner upper end, which is an angle (θ) of a virtual triangle connecting a point that is half a maximum height (h) of the jacket stripping channel and an inner side of the jacket stripping channel, may be 90 degrees or less, or may be greater than 90 degrees, such as is shown in FIG. 3F.

And a plurality of reinforcing members may be embedded at separate or symmetrical positions in the jacket in the longitudinal direction, and one or more jacket stripping channels may be provided between the plurality of reinforcing members, the plurality of reinforcing members being in the form of a wire formed of fiber reinforced plastics (FRP).

And a central tensile wire may be provided at a center of the optical cable, and a plurality of optical units may be arranged around the central tensile wire.

And the plurality of optical units may comprise at least one rollable optical fiber ribbon with a plurality of optical fibers, and an aggregation means of the optical unit may comprises a tubular member for accommodation of the at least one rollable optical fiber ribbon or a binder.

And the jacket may have a thickness of 1.0 mm to 4.0 mm.

And a minimum thickness of the jacket at the jacket stripping channel may be in a range of 0.5 mm to 3.0 mm.

And the identification means may comprise a protrusion integrally formed with the jacket.

And when a height of the jacket stripping channel is h and a thickness of a region of the jacket on which the jacket stripping channel is not formed is t, a thickness of the protrusion may be greater than or equal to a smaller value among h and (t−h) and less than or equal to a larger value among h and (t−h).

And a region on which the jacket stripping channel is formed may comprise a region occupying 10% or less of an inner circumferential surface of the jacket with respect to a cross section of the optical cable.

And the identification means may comprise stripes added to the outer circumferential surface of the jacket.

And the identification means may be continuously formed in a longitudinal direction of the outer circumferential surface of the jacket.

And to achieve these objects, the present disclosure provides an optical cable comprising: a jacket; an optical unit accommodated in the jacket and including a plurality of optical fibers; a jacket stripping channel provided as an empty space, which is in the form of a groove with round corners, on an inner circumferential surface of the jacket; a ripcord provided on the jacket stripping channel jacket; and an identification means provided on an outer circumferential surface of the jacket to identify a position at which the jacket stripping channel is formed, wherein a maximum height (h) of the jacket stripping channel is greater than an outer diameter of the ripcord.

And the optical unit may comprise an aggregation means configured to aggregate or accommodate the optical fibers.

And the ripcord may be continuously accommodated in the jacket stripping channel in a longitudinal direction.

And the ripcord may be coated with a polymer material.

And the polymer material may comprise ethylene ethyl acrylate (EEA).

And the ripcord may be disposed to be in contact with the jacket or to be covered with the jacket.

And a maximum height (h) of the jacket stripping channel may be in a range of 0.5 mm to 2.0 mm.

According to a multi-core optical cable of the present disclosure, a jacket can be stripped using a jacket stripping channel on an inner circumferential surface of the jacket and thus it is possible to reduce effort and time required to strip the jacket, thereby improving workability.

According to the multi-core optical cable of the present disclosure, an identification means such as stripes or a protrusion is provided on the outside of the jacket stripping channel to easily identify a position of the jacket stripping channel, thereby minimizing trial and error in a process of cutting the jacket stripping channel.

According to the multi-core optical cable of the present disclosure, when a protrusion is applied as the identification means to the outside of the jacket stripping channel, a reduction in a thickness of the jacket due to the formation of the jacket stripping channel can be compensated for.

According to the multi-core optical cable of the present disclosure, the jacket stripping channel is formed inside the jacket, so that the jacket stripping channel may be opened by cutting only a portion of the jacket by a cutting tool such as a cutter to expose the core of the optical cable, thereby minimizing damage to the core of the optical cable due to a worker's mistake or error.

In addition, according to the multi-core optical cable of the present disclosure, a ripcord is provided on the jacket stripping channel, so that the ripcord may be directly exposed when a region of the jacket stripping channel is open and the jacket, the thickness of which is reduced due to the jacket stripping channel may be torn and separated by the ripcord, thereby greatly improving the workability of a process of stripping the jacket of the optical cable.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 2:
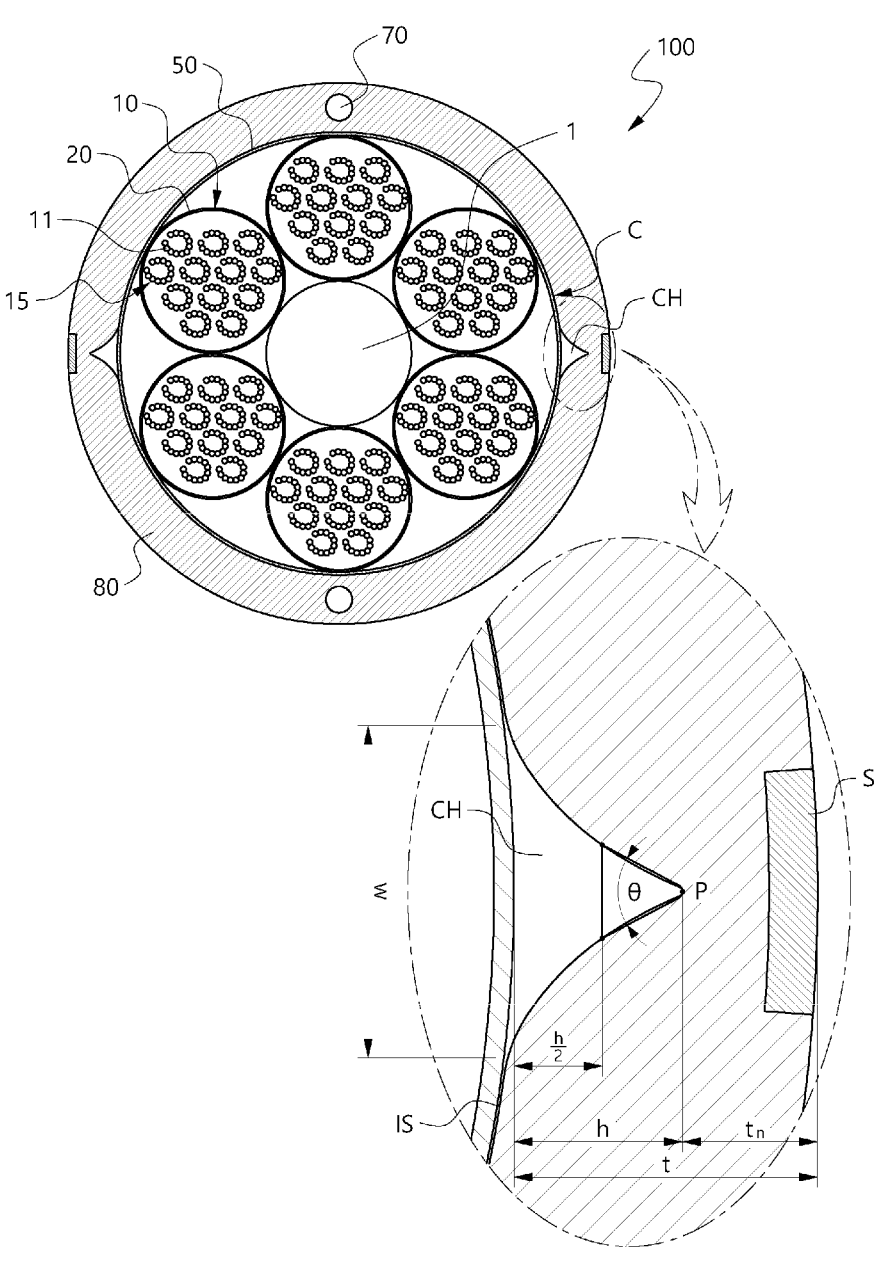
FIG. 2 is a cross-sectional view of a multi-core optical cable according to an embodiment of the present disclosure.

FIG. 2 is a cross-sectional view of a multi-core optical cable according to an embodiment of the present disclosure.

The multi-core optical cable 100 may include a core C with at least one optical unit 10 including a plurality of optical fibers and an aggregation means for aggregating or accommodating the optical fibers; a jacket 80 surrounding the core C; at least one jacket stripping channel CH formed consecutively on an inner circumferential surface IS of the jacket 80 in a longitudinal direction of the cable such that a thickness thereof decreases in a radial direction of the jacket 80; and an identification means provided on an outer circumferential surface of the jacket 80 for identification of the position of the jacket stripping channel CH outside the jacket stripping channel CH of the jacket 80, in which there may be an empty space between a highest inner end P of the jacket stripping channel CH in the radial direction and the inner circumferential surface IS of the jacket 80.

In the embodiment of FIG. 2, the optical cable 100 is shown, in which six optical units 10 are provided around a central tensile wire 1 and a tubular member 20 is applied as an aggregation means for rollable optical fiber ribbons 15 to each of the optical units 10.

Figure 1:
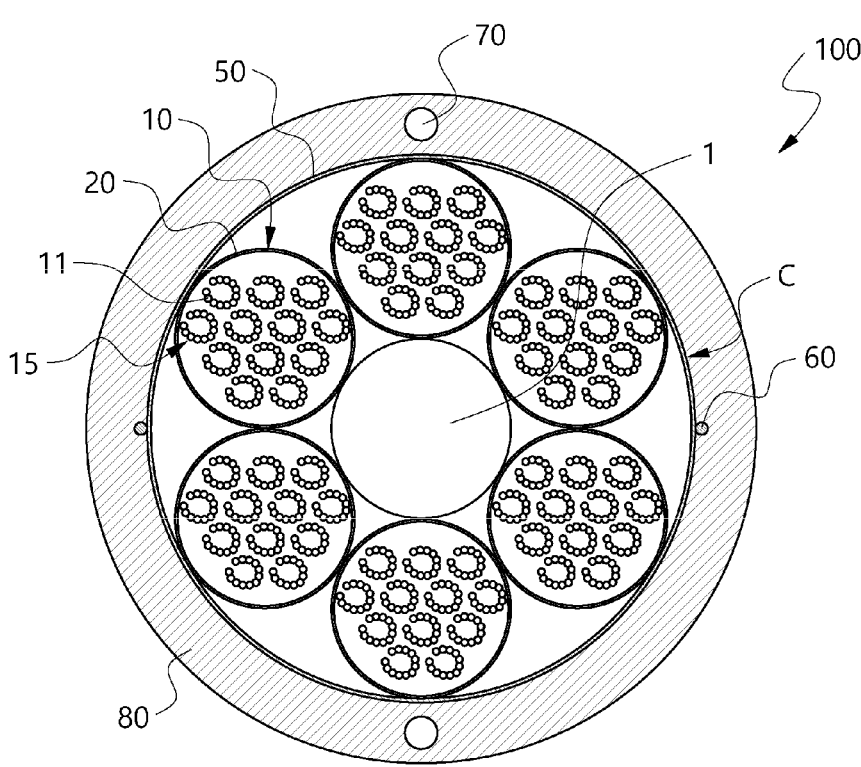
FIG. 1 is a cross-sectional view of an example of a multi-core optical cable of the related art.

According to the present disclosure, as shown in FIG. 1, in the core C of the optical cable 100, the central tensile wire 1 is provided at the center of the optical cable 100, and the optical units 10 may be arranged around the central tensile wire 1 in a circumferential direction. Such optical units may be spirally aggregated around the central tensile wire 1 to have a predetermined aggregation pitch, and be bound by an aggregation means such as binding tape. Alternatively, the plurality of optical units 10 may be provided without the central tensile wire 1.

The optical cable 100 of FIG. 2 is an example in which each of the optical units 10 is configured by accommodating twelve rollable optical fiber ribbons 15 consisting of twelve optical fibers 11 in the tubular member 20.

The optical units 10 may be aggregated in a bundle including at least one rollable optical fiber ribbon 15. Each of the at least one rollable optical fiber ribbon 15 may be understood as an optical fiber assembly in which a plurality of optical fibers arranged in a line are bonded to each other in a width direction to be connected in a lump or be rollable in the width direction and thus may be applied to increase an optical fiber density during the manufacture of a multi-core ribbon optical cable 100 because the optical fibers are not separated even when rolled up.

The number of rollable optical fiber ribbons 15 to be included in each of the optical units 10 may be increased or decreased. The optical units 10 may be configured by accommodating or aggregating general optical fiber ribbons or a number of optical fibers in an aggregation means. A binder such as a binding yarn or a binding tape may be applied as the aggregation means.

The optical units 10 may be covered with the jacket 80 to protect the optical units 10. The optical units 10 may be covered with an aggregation means 50 such as a binding tape to aggregate the optical units 10 before the optical units 10 are covered with the jacket 80.

In the embodiment shown in FIG. 2, at least one reinforcing member 70 may be embedded in the jacket 80 to reinforce rigidity, and one or both of the reinforcing member 70 and the central tensile wire 1 may be provided to reinforce the tensile strength of the optical cable 100.

The reinforcing member 70 may be in the form of a wire formed of a material such as an FRP, and be provided in a straight line shape in the longitudinal direction of the optical cable 100 to be embedded in the jacket 80 when the jacket 80 is extruded.

One or more reinforcing members 70 may be provided. When a plurality of reinforcing members 70 are provided, they may be provided at separate or symmetrical positions. When a pair of reinforcing members 70 are provided as shown in FIG. 1, they may be provided at opposite positions. The jacket stripping channels CH may be arranged between the reinforcing members 70 to be spaced apart from each other.

In such a multi-core optical cable, the jacket 80 should be stripped by a predetermined length to expose the core C of the optical cable for the connection to another optical fiber such as mid-span access, whereas in an optical cable according to the present disclosure, the jacket stripping channel CH may be formed on the inner circumferential surface IS of the jacket 80 to facilitate the stripping of the jacket 80 and prevent damage to the core C due to a cutting tool such as a cutter.

In the embodiment of FIG. 2, a total of two jacket stripping channels CH are formed at opposite positions but the number of jacket stripping channels CH may be increased or decreased.

The jacket stripping channels CH may be consecutively formed in the form of a groove with round edges on the inner circumferential surface IS of the jacket 80 in the longitudinal direction of the optical cable, so that the core may be exposed without being damaged through the removal of the jacket 80. Therefore, when the outer circumferential surface of the jacket 80 of the optical cable has a circular shape, the jacket stripping channels CH may be formed on the inner circumferential surface IS of the jacket 80 such that the thickness of the jacket 80 decreases in the radial direction.

The jacket stripping channels CH may be formed by applying and extruding an extrusion mold having a shape corresponding to that of the jacket stripping channels CH to form the jacket stripping channels CH simultaneously with the jacket 80 surrounding the core C.

As shown in FIG. 2, the jacket stripping channels CH may be configured such that a width of a cross section thereof decreases in the radial direction, thereby preventing regions of the jacket stripping channels CH from being recessed or crushed on the outer circumferential surface of the jacket 80.

The jacket stripping channel CH may be formed such that a width thereof is large in a direction toward the center of the optical cable and is small in the radial direction, and be preferably formed in a triangular shape with a convexly curved inner side surface, and a maximum width w of the jacket stripping channel CH may be greater than a maximum height h thereof.

In order to prevent the outer circumferential surface of the jacket 80 from being sunken due to the formation of the jacket stripping channel CH, the jacket stripping channel CH may be configured as having a curved surface, the width of which decreases exponentially in the radial direction, starting from the center of the optical cable, and an angle of an inner upper end, which is an angle of a vertex θ of a virtual triangle connecting a point that is half the maximum height h of the jacket stripping channel CH and the inner side P of the jacket stripping channel CH, may be set to 90 degrees or less. Additionally or alternatively, such as is shown in FIG. 3F, the angle of an inner upper end, which is an angle (θ) of a virtual triangle connecting a point that is half a maximum height (h) of the jacket stripping channel and an inner side of the jacket stripping channel, may be greater than 90 degrees. Specifically, the inner side P of the jacket stripping channel CH may have a curved shape, i.e., a shape with round corners. In addition, a radius of curvature of the jacket stripping channel CH may be set to be less than or equal to that of the optical cable, thereby preventing the optical cable from being torn even when stress is concentrated.

Therefore, when the jacket 80 of the optical cable need be stripped, a worker may expose an empty space in the jacket stripping channel CH through the jacket stripping channel CH by cutting the jacket 80 in the region of the jacket stripping channel CH to only a small degree, so that the core C may be exposed in the empty space without being damaged, thereby preventing damage to the core C caused when a depth of cutting by a cutting tool such as a cutter is not adjusted.

In general, in the case of a multi-core optical cable with 1000 cores or less, a thickness t of the jacket 80 may be in a range of 1.0 mm to 4.0 mm, and a maximum height of the jacket stripping channel CH may be in a range of 0.5 mm to 2.0 mm. Thus, a minimum thickness $t_n$ of the jacket 80 mm at the region of the jacket stripping channel CH may decrease to about 0.5 mm to 3.0 mm. The ripcord used in this case may have an outer diameter of 0.4 mm to 1.6 mm.

Therefore, conventionally, the worker exposes the core C by cutting the jacket 80 several times by the cutter to remove the jacket 80 of the thickness of 1.0 mm to 4.0 mm, but when the jacket stripping channel CH is provided, the core C can be exposed by removing only a portion of the thickness of the jacket 80, thereby exposing the core of the cable and performing work thereon.

In other words, when the jacket stripping channel CH is exposed by a cutting tool such as a cutter, the worker can take off the jacket 80 with respect to the jacket stripping channel CH as a boundary.

However, in order to maintain the appearance and function of the jacket 80, the minimum thickness $t_n$ of the jacket 80 at a position at which the jacket stripping channel CH is formed may be 20% to 90% of an average thickness t of the jacket at a position at which the jacket stripping channel CH is not formed.

When the minimum thickness $t_n$ of the jacket 80 at the position at which the jacket stripping channel CH is formed is less than 20% of the average thickness t of the jacket stripping channel 80 at which the position at which the jacket stripping channel CH is not formed, a core protection function of the jacket 80 may be insufficient and it may be difficult to maintain the shape of the cable. When the minimum thickness $t_n$ is greater than 90% of the average thickness t, a workability of exposing the core of the cable is very low.

Furthermore, the minimum thickness $t_n$ of the jacket 80 at the position at which the jacket stripping channel CH is formed may be preferably in a range of 40% to 60% of the average thickness t of the jacket 80 at the position at which the jacket stripping channel CH is not formed.

In addition, in the present disclosure, identification means may be consecutively formed on the outer circumferential surface of the jacket 80 in the longitudinal direction to easily identify the position of the jacket stripping channel CH. When the position of the jacket stripping channel CH is difficult to identify although the core is easily exposed through the jacket stripping channel H, a worker should check the position of the jacket stripping channel CH by repeatedly performing cutting.

Therefore, a multi-core optical cable according to the present disclosure may include the identification means on the outside of a jacket stripping channel to minimize trial and error of a worker, thereby improving workability.

The identification means may be stripes as shown in FIG. 2 or be a protrusion to be described below.

Stripes S applied to the embodiment of FIG. 2 should be understood to mean dots, lines, planes, text or diagrams added to the outer circumferential surface of the jacket 80 in the longitudinal direction using pigment, paint, a fluorescent material, or a reflector to be distinguished from the jacket 80 in terms of color, brightness, or the like.

Therefore, a worker may be able to easily expose an empty space in the jacket stripping channel CH by cutting along the stripes S added as the identification means to the outer circumferential surface of the jacket 80 while minimizing trial and error.

FIGS. 3 to 6 illustrates various examples of a shape of the jacket stripping channel CH.

The jacket stripping channel CH of the optical cable according to the present disclosure described above with reference to FIG. 2 may be formed in a shape that is wide in a direction toward the center of the optical cable and is narrow in the radial direction, and preferably, a triangular shape with an inner side that is convexly curved or exponentially decreases, and a maximum width w thereof is set to be greater than a height h thereof. However, the jacket stripping channel CH may be formed in any of various other shapes.

Figure 3:
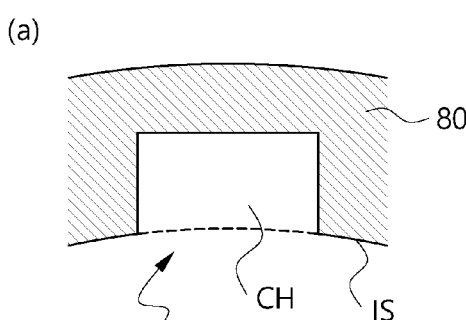
FIG. 3 illustrates various examples of a shape of a jacket stripping channel CH.
Figure 3:
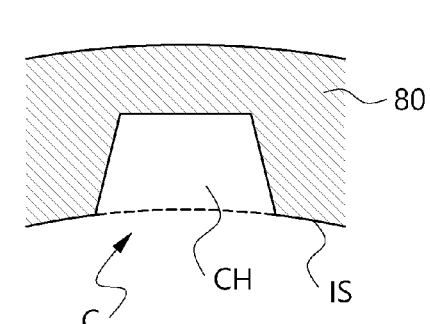
Figure 3:
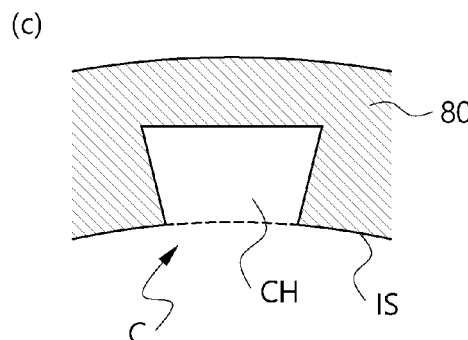
Figure 3:
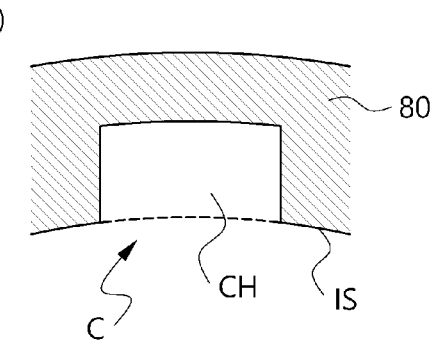
Figure 3:
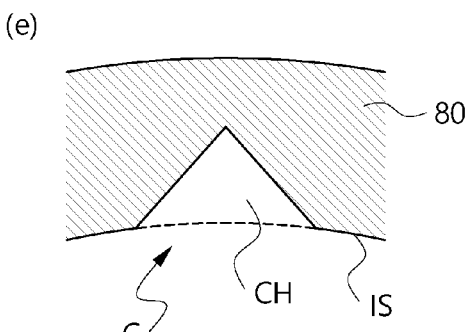
Figure 3:
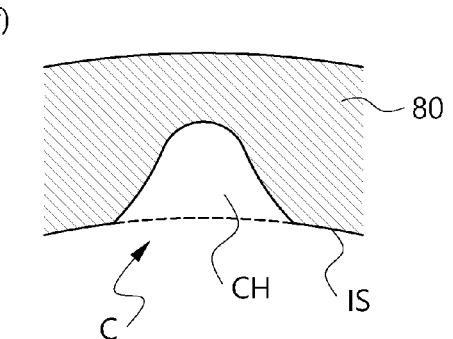

As shown in FIG. 3, the jacket stripping channel CH may have a quadrangular (or rectangular) shape (FIG. 3A), a trapezoidal (isosceles trapezoidal) shape (FIG. 3B), a reversed trapezoidal shape (FIG. 3C), a quadrangular shape with a circular-arc upper side (FIG. 3D), a triangular (isosceles triangular) shape (FIG. 3E), or a curved groove shape with curved vertices in the radial direction (FIG. 3F).

As described above, it is possible to reduce effort and time required to strip the jacket 80 of the optical cable, thus improving workability, and form the jacket stripping channel CH in various shapes when a minimum thickness of the jacket 80 at a position at which the jacket stripping channel CH is formed is secured to achieve a core protection function and maintain a shape of a cable.

Figure 4:
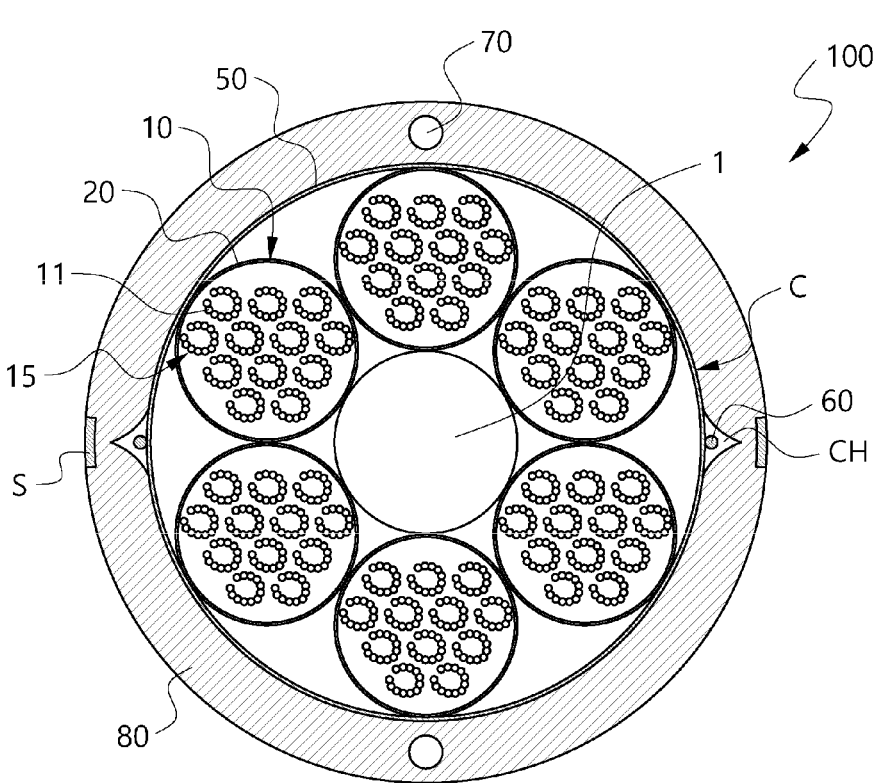
FIG. 4 is a cross-sectional view of a multi-core optical cable according to another embodiment of the present disclosure.

FIG. 4 is a cross-sectional view of a multi-core optical cable according to another embodiment of the present disclosure.

In the embodiment of FIG. 4, it is possible to form a jacket stripping channel CH inside a jacket 80 and add stripes S as identification means to an outer circumferential surface of the jacket 80 as in the embodiment of FIG. 2.

In the embodiment of FIG. 4, a ripcord 60 may further be provided inside the jacket stripping channel CH.

The ripcord 60 may be continuously provided along the jacket stripping channel CH in a longitudinal direction of the optical cable.

Therefore, when the jacket stripping channel CH is provided, a core can be exposed by removing only a portion of an entire thickness of the jacket 80 at a position at which the jacket stripping channel CH is not formed, and the jacket 80 can be separated by cutting the jacket 80 by a desired length by pulling the ripcord 60.

Although the ripcord 60 is also included in the optical cable of the related art described above with reference to FIG. 1, an entire thickness of the jacket 80 should be torn even when the jacket 80 is torn using the ripcord 60, thus requiring much effort to pull the ripcord 60 and causing the ripcord 60 from being short-circuited, and an identification means is not provided, thus making it difficult to identify the position of the ripcord 60. In the embodiment of FIG. 2, only a portion of a thickness of a region of the jacket 80 including the identification means may be removed and the ripcord 60 can be exposed to tear ad separate the jacket 80 with less effort using the ripcord 60, and trial and error when the position of the jacket stripping channel CH or the ripcord 60 is detected can be reduced, thereby greatly improving workability in the process of stripping the jacket 80.

Therefore, a worker may cut a region of the jacket 80 of the optical cable on which the identification means such as the stripes S is located by a cutting tool to partially open the jacket stripping channel CH, so that the ripcord 60 in an empty space of the jacket stripping channel CH may be exposed without being cut. Therefore, an outer diameter of the ripcord 60 accommodated in the jacket stripping channel CH is preferably less than a maximum height of the jacket stripping channel CH. When the outer diameter of the ripcord 60 and the maximum height of the jacket stripping channel CH are the same, the jacket 80 should be cut deeply by the blade of the cutting tool and thus the ripcord 60 may be partially damaged or short-circuited.

Figure 5:
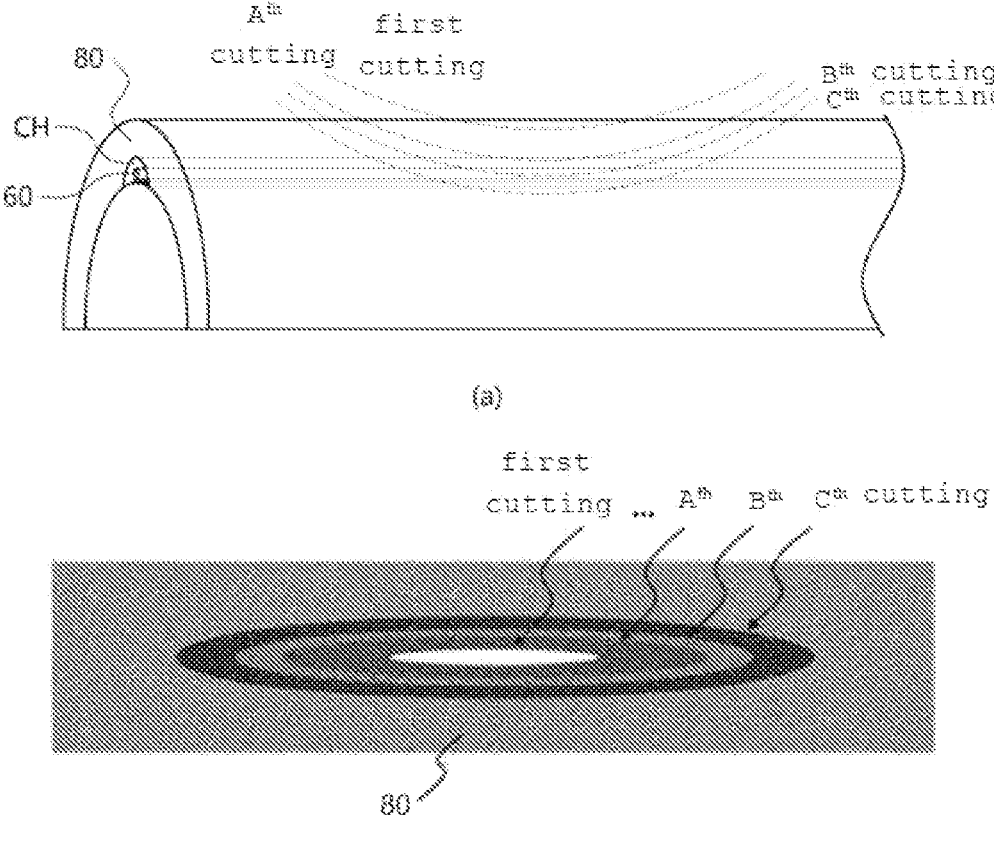
FIG. 5 illustrates a schematic view and a side view for describing a process of stripping a jacket of an optical cable according to the present disclosure.
Figure 6:
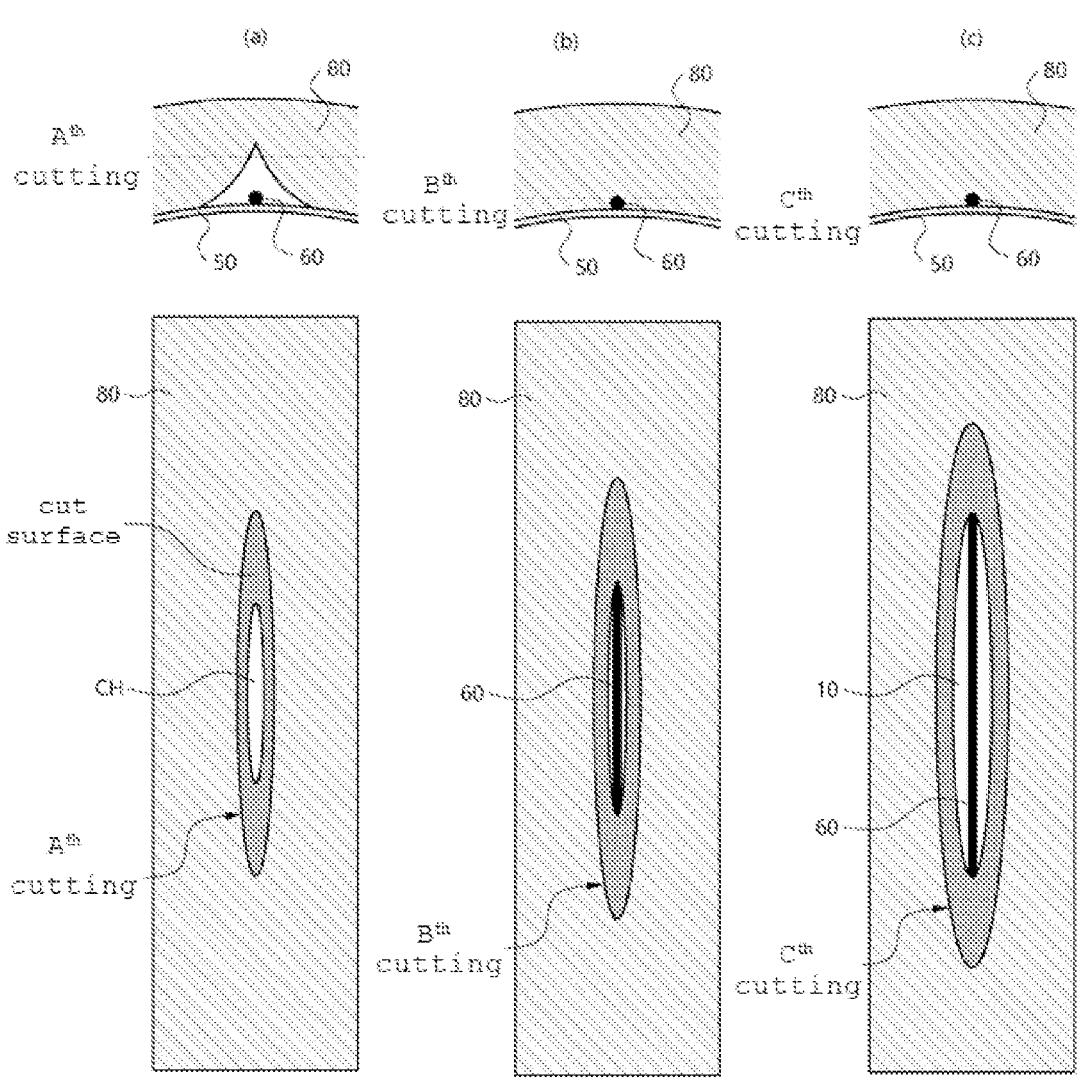
FIG. 6 illustrates states of cores of optical cables of the related art and a core of an optical cable of the present disclosure when jackets thereof are removed.

FIG. 5 illustrates a schematic view and a side view for describing a process of stripping a jacket of an optical cable according to the present disclosure. FIG. 6 illustrates states of cores of optical cables of the related art and a core of an optical cable according to the present disclosure when jackets thereof are removed.

As shown in FIG. 5A, the jacket of the optical cable should be cut and removed by a cutting tool such as a cutter to withdraw optical fibers for connection work such as intermediate connection.

In this case, as shown in FIG. 5A, the jacket may be cut several times (first, . . . $A^{th}$, $B^{th}$, and $C^{th}$ cutting operations) by the cutting tool in an inward direction from an outer circumferential surface of the jacket, and the cutting of the jacket may be repeatedly performed until the core is exposed. In this case, as shown in FIG. 5B, as the number of times of cutting increases, a length and width of the jacket to be cut exponentially increase and a worker's effort and time required to cut the jacket increase in proportion thereto.

In the optical cable according to the present disclosure, the jacket stripping channel CH is provided on the inner circumferential surface of the jacket 80 to prevent damage to the core when the jacket is cut by the cutting tool.

Specifically, referring to FIG. 5A, a worker may perform a first cutting (peeling) operation, . . . , an $A^{th}$ cutting operation, a $B^{th}$ cutting operation, and a $C^{th}$ cutting operation by a cutter-type cutting tool such as a plane or a potato knife to strip the jacket 80 using a ripcord or the like by exposing the jacket stripping channel CH. In the $A^{th}$ cutting operation, the jacket stripping channel CH may be partially opened by removing a portion of the jacket 80 on which the jacket stripping channel CH is provided and which is thinner than a portion of the jacket 80 on which the jacket stripping channel CH is not provided.

In this case, the ripcord 60 in the jacket stripping channel CH is not damaged by the cutting tool, and the worker may tear and strip the jacket 80 by pulling the ripcord 60 by expanding the exposed jacket stripping channel CH open.

However, when the $B^{th}$ cutting operation and the $C^{th}$ cutting operation are additionally performed after the $A^{th}$ cutting operation, the ripcord 60 may be partially damaged in the $B^{th}$ cutting operation and be cut in the $C^{th}$ cutting operation. In a worst-case scenario, optical units may be damaged.

However, there is an empty space in the jacket stripping channel CH, the empty space in the jacket stripping channel CH can be exposed before the ripcord 60 is cut by the worker and thus damage to the ripcord 60 and the core C can be prevented to a certain degree.

FIG. 6 is a diagram illustrating in more detail states of cross sections and sides of cores of optical cables of the related art and a core of an optical cable of the present disclosure when jackets 80 thereof are removed. Specifically, FIG. 6A is a cross-sectional view of the optical cable of the present disclosure in a process of stripping a jacket. FIGS. 6B and 6C illustrate a process of cutting the optical cables of the related art.

As shown in FIG. 6, in the case of the optical cable of the present disclosure (see FIG. 6A), in the $A^{th}$ cutting operation, a portion of the jacket that is thinner than a portion of the jacket on which the jacket stripping channel CH is not formed may be removed by a cutting tool to partially expose a jacket stripping channel CH as described above.

However, in the case of the optical cable of the related art shown in FIG. 6B, a ripcord is in contact with a jacket and thus may be damaged in the $B^{th}$ cutting operation when the jacket is repeatedly cut to a shallow depth until the core is exposed. On the other hand, in the case of FIG. 6C, in the $C^{th}$ cutting operation, the ripcord may be cut and optical units may be damaged in a worst-case scenario, when the jacket is cut deeply only once by the cutting tool, when a thickness of a region of the jacket on which the ripcord is provided is relatively small, or when a diameter of the ripcord is large.

Therefore, in the case of the optical cables of the related art shown in FIGS. 6B and 6C, the cores may be easily damaged and the number of times of cutting may increase when a thickness to which the jackets are to be cut is not accurately controlled due to the lack of proficiency or carelessness of a worker, whereas in the optical cable of the present disclosure shown in FIG. 6A, the jacket stripping channel CH can be exposed to a large extent when the jacket is sequentially cut to an appropriate thickness, thereby stripping the jacket while preventing damage to the core.

As shown in FIG. 6A, when the jacket stripping channel CH is opened by an appropriate length in the $A^{th}$ cutting operation, a remaining portion of the jacket 80 after the removal of the jacket 80 may be continuously removed by pulling the ripcord 60 inside the jacket 80 in the radial direction, thereby expanding a degree of openness of the jacket stripping channel CH.

In this case, when a width of a cross section of the jacket stripping channel CH decreases in the radial direction, the ripcord 60 may be naturally moved to a narrow region of the jacket 80 when the ripcord 60 is pulled and thus a force applied to the jacket 80 by the ripcord 60 may be concentrated on the narrow region, thereby facilitating the removal of the jacket 80.

However, when a width of an inner side P is excessively small or corners thereof are pointed, a large force is likely to be concentrated thereon and thus the jacket 80 may be damaged due to impacts, bending, or torsion caused during the manufacture, storing, transportation, installation, etc. of the optical cable 100.

To prevent such a risk, the jacket stripping channel CH may be formed to have round corners, and preferably, a radius of curvature of the corners may be set to be less than or equal to that of the optical cable.

Figure 7:
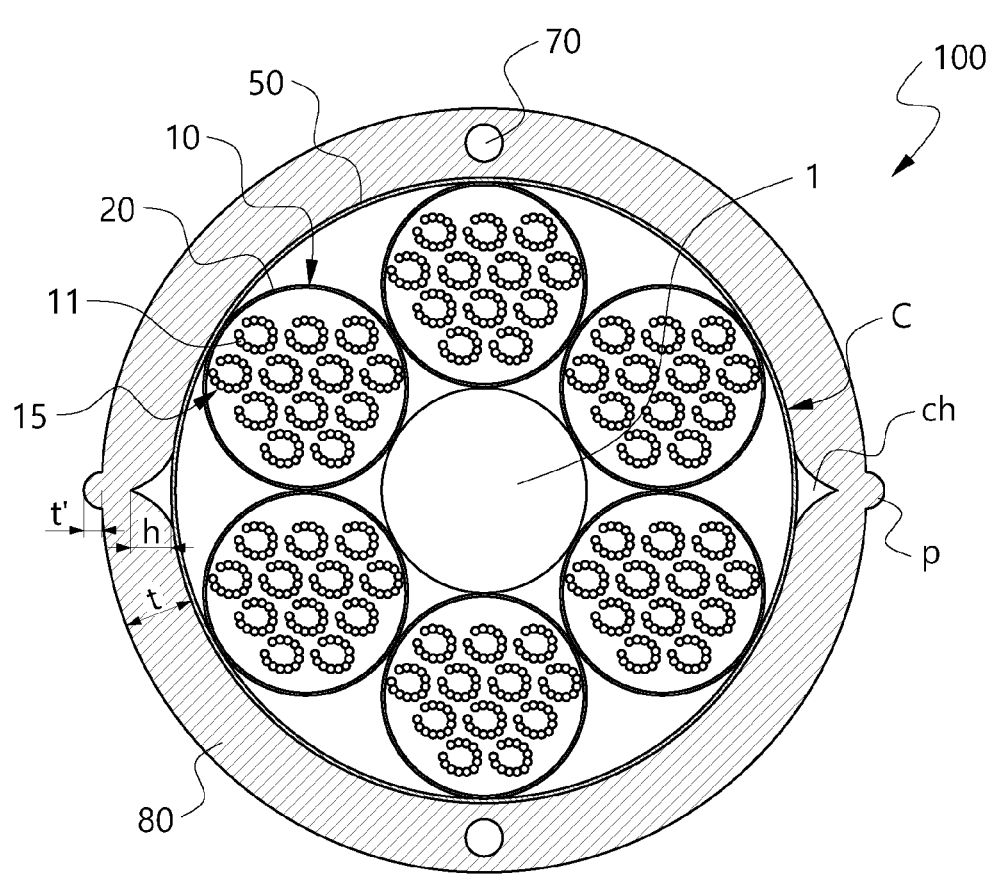
FIG. 7 is a cross-sectional view of a multi-core optical cable according to another embodiment of the present disclosure.

FIG. 7 is a cross-sectional view of a multi-core optical cable according to another embodiment of the present disclosure.

In the embodiment of FIG. 7, a protrusion p is provided as the identification means instead of stripes.

The protrusion P may be integrally formed with the outside of a jacket 80 in a longitudinal direction of the jacket 80 to identify a position of a jacket stripping channel CH.

The protrusion p is integrally formed with the jacket 80, and may be formed to be extruded together with the jacket 80 without a separate pigment or paint.

Therefore, the protrusion p may also be formed in the longitudinal direction of the jacket 80, and thus, a worker may expose the jacket stripping channel CH by cutting a region on which the protrusion p is formed by a cutting tool, thus minimizing trial and error when the jacket stripping channel CH is detected during the stripping of the jacket 80.

The protrusion p provided as identification means for identification of the position of the jacket stripping channel CH may compensate for a reduction in a thickness of the jacket 80 due to the formation of the jacket stripping channel CH.

In relation to a thickness of the protrusion p, when a maximum height h of the jacket stripping channel is h and a thickness of a region of the jacket on which the jacket stripping channel is not formed is t, a thickness t' of the protrusion p may be set to be greater than or equal to a smaller value among h and (t–h) and less than or equal to a larger value among h and (t–h) so as to maintain the structure of the optical cable and facilitate workability.

To maintain the appearance of the optical cable, a plurality of jacket stripping channels may be formed at separate positions on the inner circumferential surface of the jacket 80, and a region on which the jacket stripping channels CH are formed may be a region occupying 10% or less of the inner circumferential surface of the jacket 80 with respect to a cross section of the optical cable.

Figure 8:
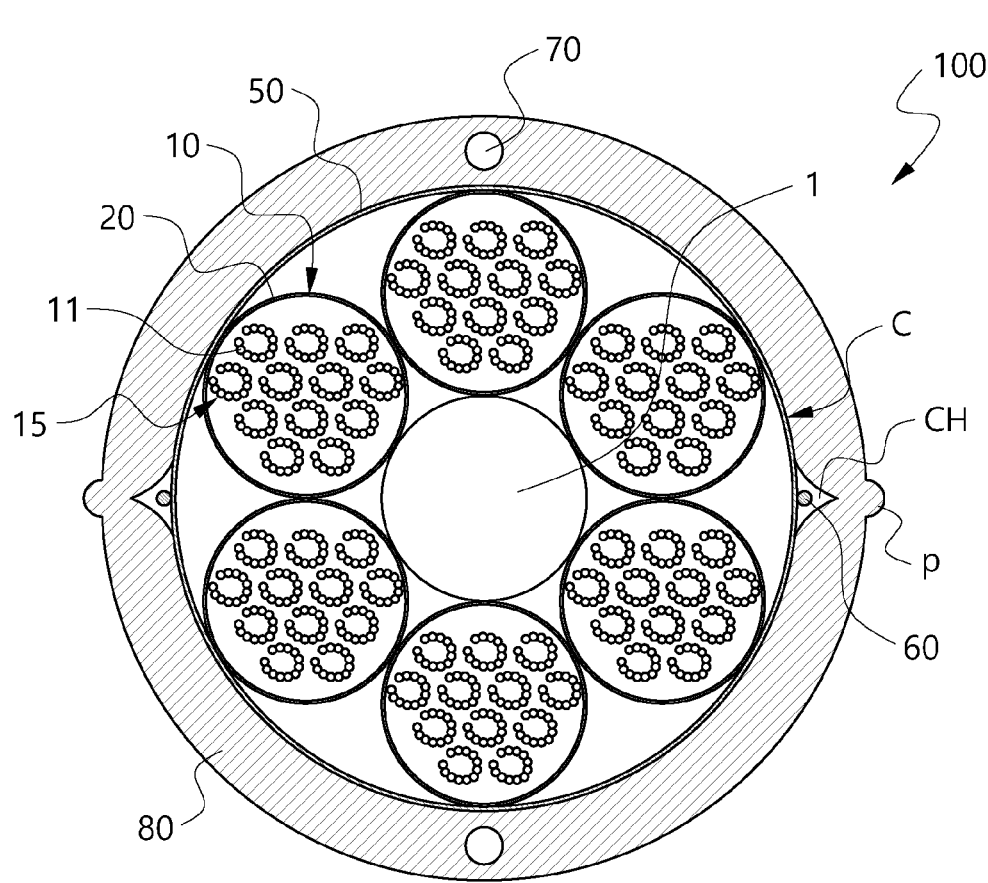
FIG. 8 is a cross-sectional view of a multi-core optical cable according to another embodiment of the present disclosure.

FIG. 8 is a cross-sectional view of a multi-core optical cable according to another embodiment of the present disclosure.

In the embodiment of FIG. 8, an example in which both the ripcord 60 shown in the embodiments of FIGS. 4 and 7 and a protrusion p are provided is shown.

Thus, in the multi-core optical cable according to the present disclosure shown in FIG. 8, a jacket 80 of the optical cable may be stripped using a jacket stripping channel CH on an inner circumferential surface IS of the jacket 80 and the ripcord 60 to reduce effort and time required to strip the jacket 80, minimize damage to a core C of the optical cable due to a worker's trial and error, and tear and separate the jacket 80, the thickness of which is reduced due to the jacket stripping channel CH using the ripcord 60, as in the embodiment of FIG. 4. Furthermore, as shown in FIG. 7, the protrusion p may be provided on the outside of the jacket stripping channel CH to easily identify the position of the jacket stripping channel CH, thereby minimizing trial and error in a cutting process for exposing the jacket stripping channel CH.

In addition, when the protrusion p is provided in a region of the jacket stripping channel CH, a reduction in a thickness of the jacket 80 due to the formation of the jacket stripping channel CH can be compensated for, thereby preventing cracks or the like caused when the jacket stripping channel is formed.

The position of the ripcord 60 may be identified by an identification means such as the protrusion p but an actual position of the ripcord 60 may be changed when the optical cable is bent or twisted. When the ripcord 60 is coated with a polymer material such as ethylene ethyl acrylate (EEA) to prevent movement thereof, the position of the ripcord 60 may be fixed when the polymer material is melted at high extrusion temperature and combined with the jacket 80 during the extrusion of the jacket 80.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:
1. An optical cable comprising:
a core including at least one optical unit with a plurality of optical fibers;
a jacket surrounding the core;
a jacket stripping channel formed consecutively as an empty space between the jacket and the core in a longitudinal direction of the optical cable; and
an identification means provided continuously in the longitudinal direction on an outer circumferential surface of the jacket to identify a position, at which the jacket stripping channel is formed, outside the jacket, wherein:
the jacket stripping channel is in the form of a groove having round corners and formed on an inner circumferential surface of the jacket, and the empty space of the jacket stripping channel is exposed without causing damage to the core when the jacket is removed along the identification means by a jacket stripping tool,
a maximum height of the jacket stripping channel is 0.5 millimeters (mm) or more, and
a minimum thickness ($t_n$) of the jacket at the position at which the jacket stripping channel is formed is in a range of 20% to 90% of an average thickness of the jacket at which a position at which the jacket stripping channel is not formed,
an inflection point is formed at an inner upper end of the jacket stripping channel, and the inflection point is located inside a line connecting the outer circumferential surface of the jacket in a region where the identification means is not formed,
a width of a cross section of the jacket stripping channel constantly decreases in a radial direction from a center of the optical cable, and
the width of the cross section of the jacket stripping channel decreases non-linearly.
2. The optical cable of claim 1, wherein the jacket stripping channel is formed to cause a thickness of the jacket in a radial direction from a center of a cross section of the optical cable to be less than a thickness of the jacket at a position at which the identification means is not provided.

3. The optical cable of claim 1, wherein a radius of curvature of an inner side of the jacket stripping channel is less than or equal to a radius of curvature of the optical cable.

4. The optical cable of claim 1, wherein a maximum width of the jacket stripping channel is greater than the maximum height of the jacket stripping channel.

5. The optical cable of claim 1, wherein an angle of an inner upper end, which is an angle ($\theta$) of a virtual triangle connecting a point that is half a maximum height (h) of the jacket stripping channel and an inner side of the jacket stripping channel, is 90 degrees or less.

6. The optical cable of claim 1, wherein a plurality of reinforcing members are embedded at separate or symmetrical positions in the jacket in the longitudinal direction, and one or more jacket stripping channels are provided between the plurality of reinforcing members, the plurality of reinforcing members being in the form of a wire formed of fiber reinforced plastics (FRP).

7. The optical cable of claim 1, wherein a central tensile member is provided at a center of the optical cable, and a plurality of optical units are arranged around the central tensile member.

8. The optical cable of claim 7, wherein the plurality of optical units comprise at least one rollable optical fiber ribbon with a plurality of optical fibers, and an aggregation means of the optical unit comprises a tubular member for accommodation of the at least one rollable optical fiber ribbon or a binder.

9. The optical cable of claim 1, wherein the jacket has a thickness of 1.0 mm to 4.0 mm; and wherein a minimum thickness of the jacket at the jacket stripping channel is in a range of 0.5 mm to 3.0 mm.

10. The optical cable of claim 1, wherein the identification means comprises a protrusion integrally formed with the jacket; and wherein, when a height of the jacket stripping channel is h and a thickness of a region of the jacket on which the jacket stripping channel is not formed is t, a thickness of the protrusion is greater than or equal to a smaller value among h and (t–h) and less than or equal to a larger value among h and (t–h).

11. The optical cable of claim 1, wherein a region on which the jacket stripping channel is formed comprises a region occupying 10% or less of an inner circumferential surface of the jacket with respect to a cross section of the optical cable.

12. The optical cable of claim 1, wherein the identification means comprises stripes added to the outer circumferential surface of the jacket.

13. An optical cable comprising:
a jacket;
an optical unit accommodated in the jacket and including a plurality of optical fibers;
a jacket stripping channel provided as an empty space, which is in the form of a groove with round corners, on an inner circumferential surface of the jacket;
a ripcord provided on the jacket stripping channel; and
an identification means provided on an outer circumferential surface of the jacket to identify a position at which the jacket stripping channel is formed,
wherein a maximum height (h) of the jacket stripping channel is greater than an outer diameter of the ripcord; and wherein the ripcord is continuously accommodated in the jacket stripping channel in a longitudinal direction,
wherein an inflection point is formed at an inner upper end of the jacket stripping channel, and the inflection point is located inside a line connecting the outer circumferential surface of the jacket in a region where the identification means is not formed,
wherein a width of a cross section of the jacket stripping channel constantly decreases in a radial direction from a center of the optical cable, and
wherein the width of the cross section of the jacket stripping channel decreases non-linearly.

14. The optical cable of claim 13, wherein the optical unit comprises an aggregation means configured to aggregate or accommodate the plurality of optical fibers.

15. The optical cable of claim 13, wherein the ripcord is coated with a polymer material.

16. The optical cable of claim 15, wherein the ripcord is disposed to be in contact with the jacket or to be covered with the jacket.

17. The optical cable of claim 13, wherein a maximum height (h) of the jacket stripping channel is in a range of 0.5 mm to 2.0 mm.

18. The optical cable of claim 1, wherein an angle of an inner upper end, which is an angle ($\theta$) of a virtual triangle connecting a point that is half a maximum height (h) of the jacket stripping channel and an inner side of the jacket stripping channel, is greater than 90 degrees.

19. An optical cable comprising:
a core including an optical unit with a plurality of optical fibers;
a jacket surrounding the core, the jacket defining a jacket stripping channel formed consecutively as an empty space between the jacket and the core in a longitudinal direction of the optical cable; and
an identification means provided continuously in the longitudinal direction on an outer circumferential surface of the jacket to identify, outside the jacket, a position at which the jacket stripping channel is formed inside the jacket,
wherein:
the jacket stripping channel defines a groove on an inner circumferential surface of the jacket via a first rounded corner of the inner circumferential surface of the jacket that meets at an inflection point with a second rounded corner of the inner circumferential surface of the jacket,
the inflection point is located inside a line connecting the outer circumferential surface of the jacket in a region where the identification means is not formed, and
a distance between the first rounded corner and the second rounded corner constantly and non-linearly decreases until reaching the inflection point.

20. The optical cable of claim 19, wherein:
a maximum height of the jacket stripping channel is at least 0.5 millimeters (mm) in a radial direction of the optical cable, and
a minimum thickness ($t_n$) of the jacket at the position at which the jacket stripping channel is formed is between 20% and 90% of an average thickness of the jacket at a position at which the jacket stripping channel is not formed.

* * * * *